US011073044B2

(12) United States Patent
DiBenedetto

(10) Patent No.: US 11,073,044 B2
(45) Date of Patent: Jul. 27, 2021

(54) ADJUSTABLE FLOATING OIL CHANNEL FOR GAS TURBINE ENGINE GEAR DRIVE

(71) Applicant: UNITED TECHNOLOGIES CORPORATION, Hartford, CT (US)

(72) Inventor: Enzo DiBenedetto, Kensington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1501 days.

(21) Appl. No.: 13/745,943

(22) Filed: Jan. 21, 2013

(65) Prior Publication Data

US 2014/0255162 A1   Sep. 11, 2014

(51) Int. Cl.
*F01D 25/24*   (2006.01)
*F02C 7/06*   (2006.01)
*F02C 7/36*   (2006.01)
*F01D 25/18*   (2006.01)
*F01D 25/16*   (2006.01)

(52) U.S. Cl.
CPC ......... *F01D 25/243* (2013.01); *F01D 25/162* (2013.01); *F01D 25/18* (2013.01); *F02C 7/06* (2013.01); *F02C 7/36* (2013.01); F05D 2230/642 (2013.01); F05D 2260/602 (2013.01); F05D 2260/609 (2013.01); F05D 2300/50212 (2013.01); Y02T 50/60 (2013.01)

(58) Field of Classification Search
CPC ...... F01D 25/16; F01D 25/162; F01D 25/164; F01D 25/18; F01D 25/243; F05D 2230/642
See application file for complete search history.

(56) References Cited

U.S. PATENT DOCUMENTS 3,451,215 A * 6/1969 Barr .......................... F02C 7/27
60/787
4,247,248 A * 1/1981 Chaplin .................. F01D 11/24
415/136

(Continued)

OTHER PUBLICATIONS

International Preliminary Report on Patentability for International Application No. PCT/US2014/012165 dated Jul. 30, 2015.

(Continued)

*Primary Examiner* — Kenneth Bomberg
*Assistant Examiner* — Christopher R Legendre
(74) *Attorney, Agent, or Firm* — Carlson, Gaskey & Olds, P.C.

(57) ABSTRACT

A turbine is operably connected to drive a compressor, and to drive a fan through a gear drive. A number of intermediate gears connecting an output shaft of the turbine to a fan drive shaft for the fan. An oil channel collects oil thrown outwardly of the gear drive. A bearing support mounts bearings supporting the fan drive shaft. The oil channel and the bearing support each include mating faces that are bolted together by a plurality of bolts. The bolts extend through oil channel holes in the mating face of the oil channel. The oil channel holes have one dimension which closely receives the bolts and another dimension which is larger than an outer diameter of the extending portion of the bolts, such that the bolts may adjust radially within the oil channel holes.

9 Claims, 4 Drawing Sheets

(56) References Cited

U.S. PATENT DOCUMENTS

| | | | |
|---|---|---|---|
| 6,220,815 B1 * | 4/2001 | Rainous | F01D 11/001 415/174.5 |
| 6,494,032 B2 * | 12/2002 | Udall | F01D 21/045 415/9 |
| 6,499,957 B1 * | 12/2002 | Klingels | F01D 5/066 416/198 A |
| 6,658,853 B2 * | 12/2003 | Matsuda | F01D 9/023 60/753 |
| 6,887,043 B2 * | 5/2005 | Dix | F01D 5/066 416/244 A |
| 7,260,892 B2 * | 8/2007 | Schilling | F01D 25/16 29/434 |
| 7,900,461 B2 * | 3/2011 | Varney | F01D 25/243 60/752 |
| 7,967,560 B2 | 6/2011 | DiBenedetto | |
| 7,971,423 B2 | 7/2011 | Avila et al. | |
| 8,932,022 B2 * | 1/2015 | Ivakitch | F16D 1/076 416/204 R |
| 2003/0046940 A1 | 3/2003 | Matsuda et al. | |
| 2009/0120098 A1 | 5/2009 | Avila et al. | |
| 2010/0011780 A1 | 1/2010 | Varney et al. | |
| 2010/0105516 A1 * | 4/2010 | Sheridan | F01D 25/18 475/346 |
| 2011/0108360 A1 | 5/2011 | DiBenedetto | |
| 2011/0286836 A1 * | 11/2011 | Davis | F01D 25/16 415/170.1 |
| 2011/0297485 A1 | 12/2011 | Sheridan et al. | |
| 2012/0238391 A1 | 9/2012 | McCune et al. | |
| 2012/0260623 A1 | 10/2012 | McCune et al. | |
| 2012/0324899 A1 | 12/2012 | DiBenedetto et al. | |
| 2014/0169941 A1 * | 6/2014 | DiBenedetto | F01D 25/18 415/111 |
| 2014/0255162 A1 * | 9/2014 | DiBenedetto | F01D 25/162 415/122.1 |

OTHER PUBLICATIONS

International Search Report and Written Opinion for International Application No. PCT/US2014/012165 completed on May 9, 2014.

Supplementary European Search Report for European Application No. 14741162.3 dated May 19, 2016.

* cited by examiner

ADJUSTABLE FLOATING OIL CHANNEL FOR GAS TURBINE ENGINE GEAR DRIVE

BACKGROUND OF THE INVENTION

This application relates to mounting an oil channel which collects oil from a fan drive gear in a gas turbine engine.

Gas turbine engines are known and typically include a fan delivering air into a bypass duct as propulsion air and into a compressor section. The compressor section may include a pair of compressor rotors, with one operating at a lower pressure than a second. The air is compressed serially across the two compressor rotors and delivered into a combustion section. The air is mixed with fuel and ignited, and products of the combustion pass downstream over at least two turbine rotors, with one turbine rotor operating at a higher pressure than the other. The lower pressure turbine rotor drives the lower pressure compressor and may drive the fan. Historically, the lower pressure turbine drove the lower pressure compressor and the fan at a single speed.

More recently, a gear drive has been provided between the fan and the lower pressure turbine. This allows the fan to rotate at a slower speed than the lower pressure compressor, which has many benefits.

The gear drive is a complex device involving any number of interrelated systems. Oil is critical for the gear drive and there is an oil supply system.

An oil collection component, known as an oil channel, is positioned radially outwardly of a ring gear that is part of the fan drive gear. The oil channel has been mounted to a bearing support housing. The bearing support housing is formed of an appropriate titanium alloy. It is desirable to form the oil channel of a lighter weight material and aluminium has been utilized. Differences in thermal expansion between the aluminium and the titanium alloy have raised challenges at a mount interface.

SUMMARY OF THE INVENTION

In a featured embodiment, a gas turbine engine has a propuslor that includes a fan and a fan drive gear architecture for rotating about a central axis. The fan drive gear architecture includes a number of intermediate gears connecting an output shaft of a fan drive turbine to a fan drive shaft for the fan. An oil channel collects oil thrown radially outwardly of the fan drive gear architecture. A bearing support mounts bearings that support the fan drive shaft. The oil channel and bearing support are fixed together by elongated connecting members that have respective shafts extending through slots in the oil channel. A slot width sized to closely receive the connecting member shafts and a slot length is relatively larger. The connecting members may adjust in a radial direction within the slots to allow the oil channel and bearing support to expand at different rates in the radial direction.

In another embodiment according to the previous embodiment, the oil channel holes are generally racetrack shape with two generally parallel side surfaces defining the width extending outwardly in a generally radial direction and curved ends at radial ends of the oil channel holes defining the length.

In another embodiment according to any of the previous embodiments, an insert is inserted into spaced locations in the oil channel and said insert defining said slots.

In another embodiment according to any of the previous embodiments, a gasket is positioned intermediate the bearing support and oil channel.

In another embodiment according to any of the previous embodiments, the oil channel has a pair of surfaces for receiving oil thrown radially outwardly of a ring gear in the gear drive.

In another embodiment according to any of the previous embodiments, the surfaces are spaced on opposed sides of a centerline of the ring gear.

In another embodiment according to any of the previous embodiments, the slots are formed in an insert force fit into spaced locations on the oil channel.

In another embodiment according to any of the previous embodiments, the inserts are formed of a material that is relatively hard compared to a material forming the oil channel.

In another embodiment according to any of the previous embodiments, both of the inserts and connecting members are formed of an appropriate steel.

In another embodiment according to any of the previous embodiments, bearing support is formed of a titanium alloy and said oil channel is formed of aluminum.

In another embodiment according to any of the previous embodiments, a Belleville spring washer sits between a head of the connecting members and the oil channel, with the Belleville washer urging the oil channel toward the bearing support to compensate for any wear during operation of the gas turbine engine.

In another embodiment according to any of the previous embodiments, the connecting members are bolts.

In another featured embodiment, a gas turbine engine has a propuslor that includes a fan and a fan drive gear architecture for rotating about a center axis. The fan drive gear architecture includes a number of intermediate gears connecting an output shaft of the turbine to a fan drive shaft for the fan. An oil channel collects oil thrown radially outwardly of the fan drive gear architecture. A bearing support mounts bearings, or the bearing supporting the fan drive shaft. The oil channel and bearing support are fixed together by elongated connecting members that have respective shafts extending through slots in the oil channel. The slots are generally racetrack shape with two generally parallel side surfaces extending outwardly in a generally radial direction and curved ends at radial ends of the slots. An insert is inserted into spaced locations in the oil channel. The insert defines the slots. A gasket is positioned intermediate the bearing support and oil channel. The oil channel has a pair of surfaces for receiving oil thrown radially outwardly of a ring gear in the gear drive. The surfaces are spaced on opposed sides of a centerline of the ring gear. The bearing support is formed of a titanium alloy and the oil channel is formed of aluminum. A slot width is defined perpendicular to the generally parallel side surfaces. A slot length is defined between the radial ends, and the slot width is sized to closely receive the shafts of the connecting members. The slot length is relatively larger whereby the connecting members may adjust in a radial direction within the slots to allow the oil channel and bearing support to expand at different rates in a radial direction.

In another embodiment according to the previous embodiment, the insert is force fit into spaced locations in the oil channel.

In another embodiment according to any of the previous embodiments, the inserts are formed of a material that is relatively hard compared to a material forming the oil channel.

In another embodiment according to any of the previous embodiments, both the inserts and bolts are formed of an appropriate steel.

In another embodiment according to any of the previous embodiments, a Belleville spring washer sits between a head of the bolts and oil channel, with the Belleville washer urging the oil channel toward the bearing support to compensate for any wear during operation of the gas turbine engine.

These and other features may be best understood from the following drawings and specification.

DETAILED DESCRIPTION

Figure 1:
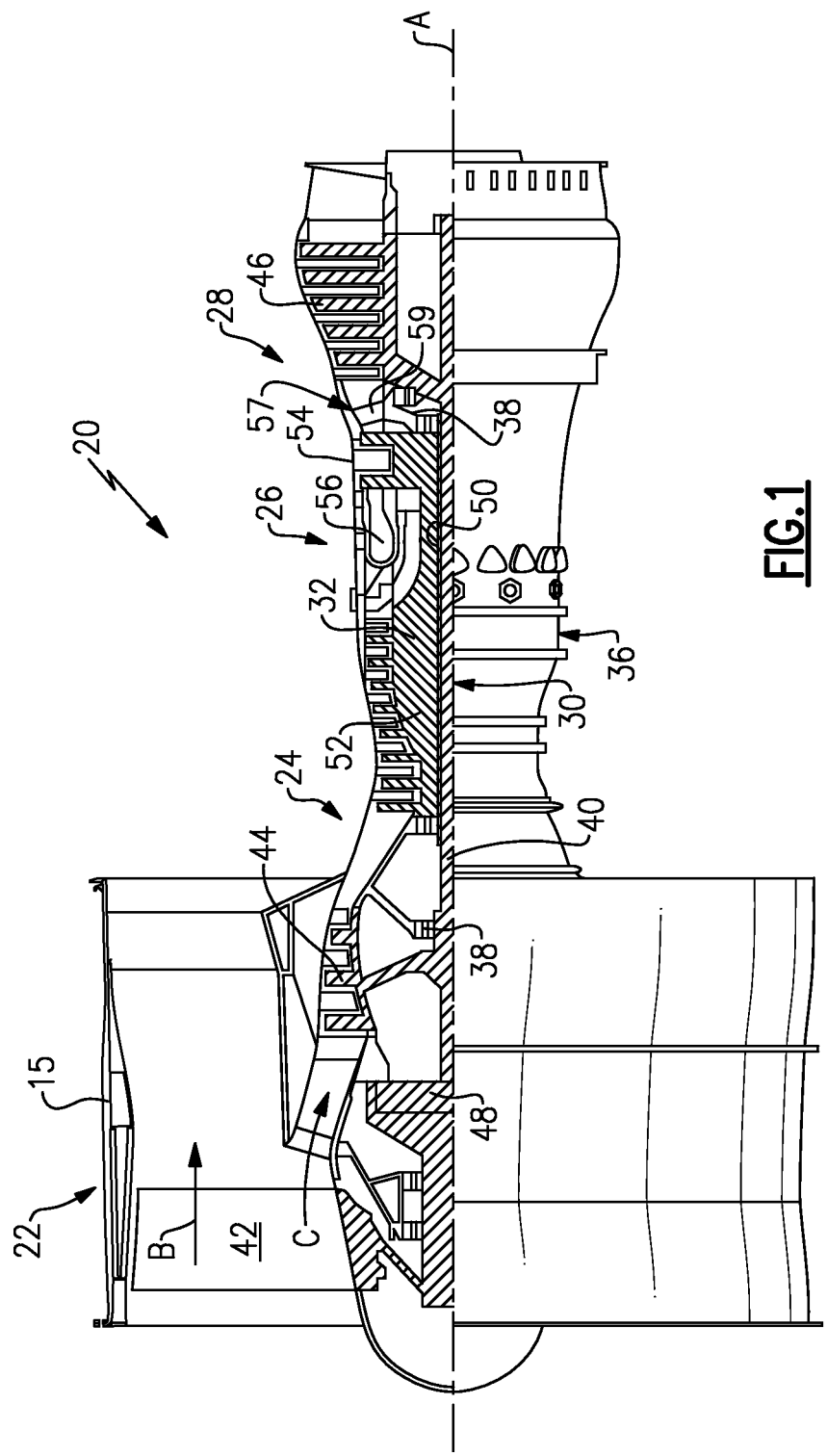
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second.

Figure 2:
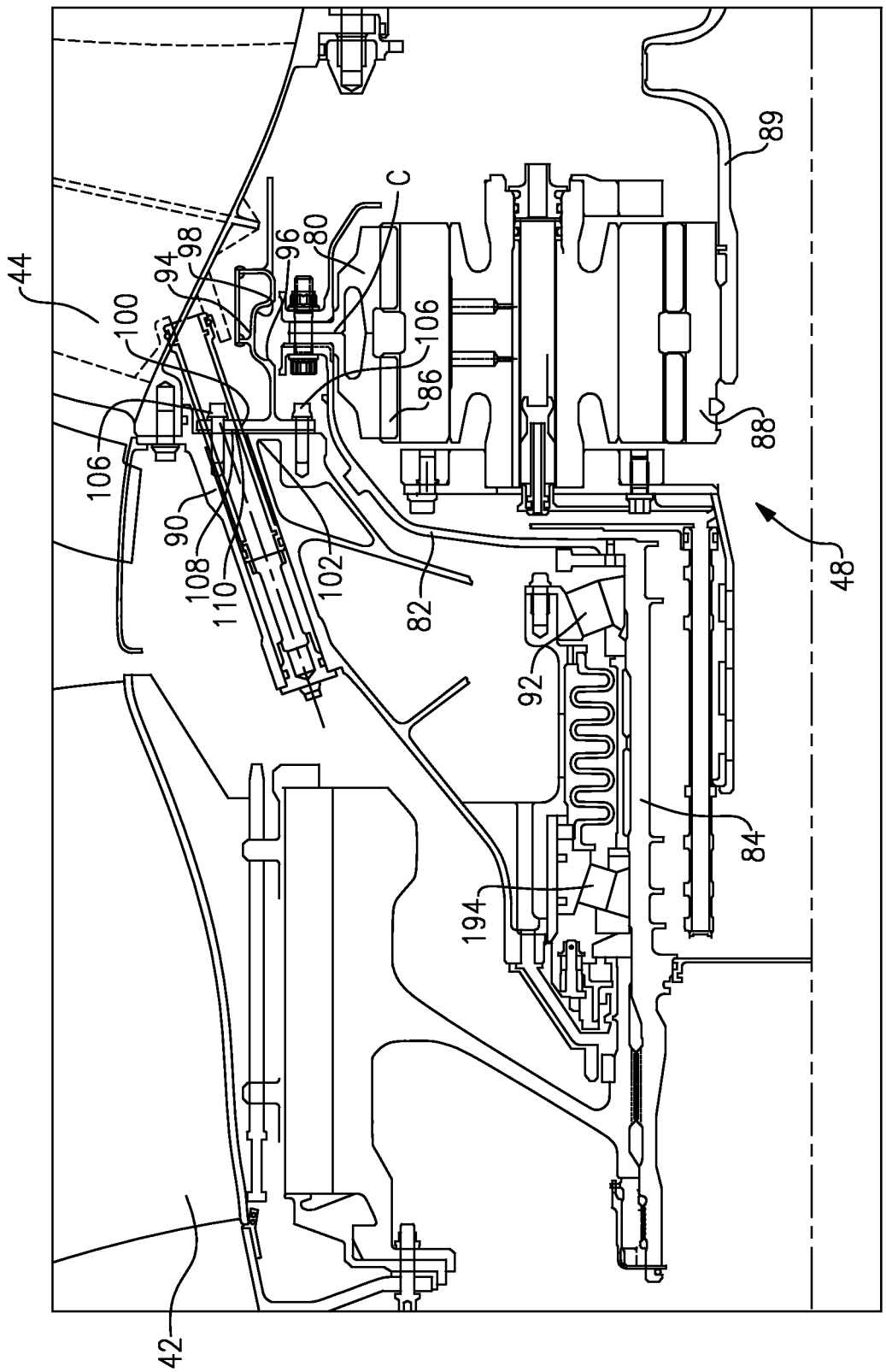
FIG. 2 is a cross-sectional view through a portion of a gas turbine engine.

FIG. 2 shows a portion of a gear drive 48 for driving the fan 42. As shown, a pair of bearings 92 and 194 are supported in a bearing support 90. The bearings 92 and 194 support a shaft 84 which is downstream of the gear drive 48, and which connects the gear drive 48 to the fan 42.

The shaft 84 is driven by an element 82 driven by a ring gear 80. The ring gear 80 is driven by planet gears 86 that are, in turn, driven by a sun gear 88. An input 89 drives the sun gear 88. It may also be that a star gear configuration can be used as a gear drive and benefit from the teaching of this application.

An oil collector, known as an oil channel 94, is positioned radially outwardly of the ring gear 80. As shown, there are surfaces 96 and 98 on opposed sides of a center plane C of the ring gear 80, which serve to capture and collect oil which is thrown outwardly of the gear drive 48. The oil channel 94 includes a surface or face 100 which is connected to a surface or face 110 of the bearing support 90. A Teflon® gasket 108 is positioned between the surfaces 100 and 110. Bolts 106 are shown securing the surface 100 to the surface 110.

Figure 3:
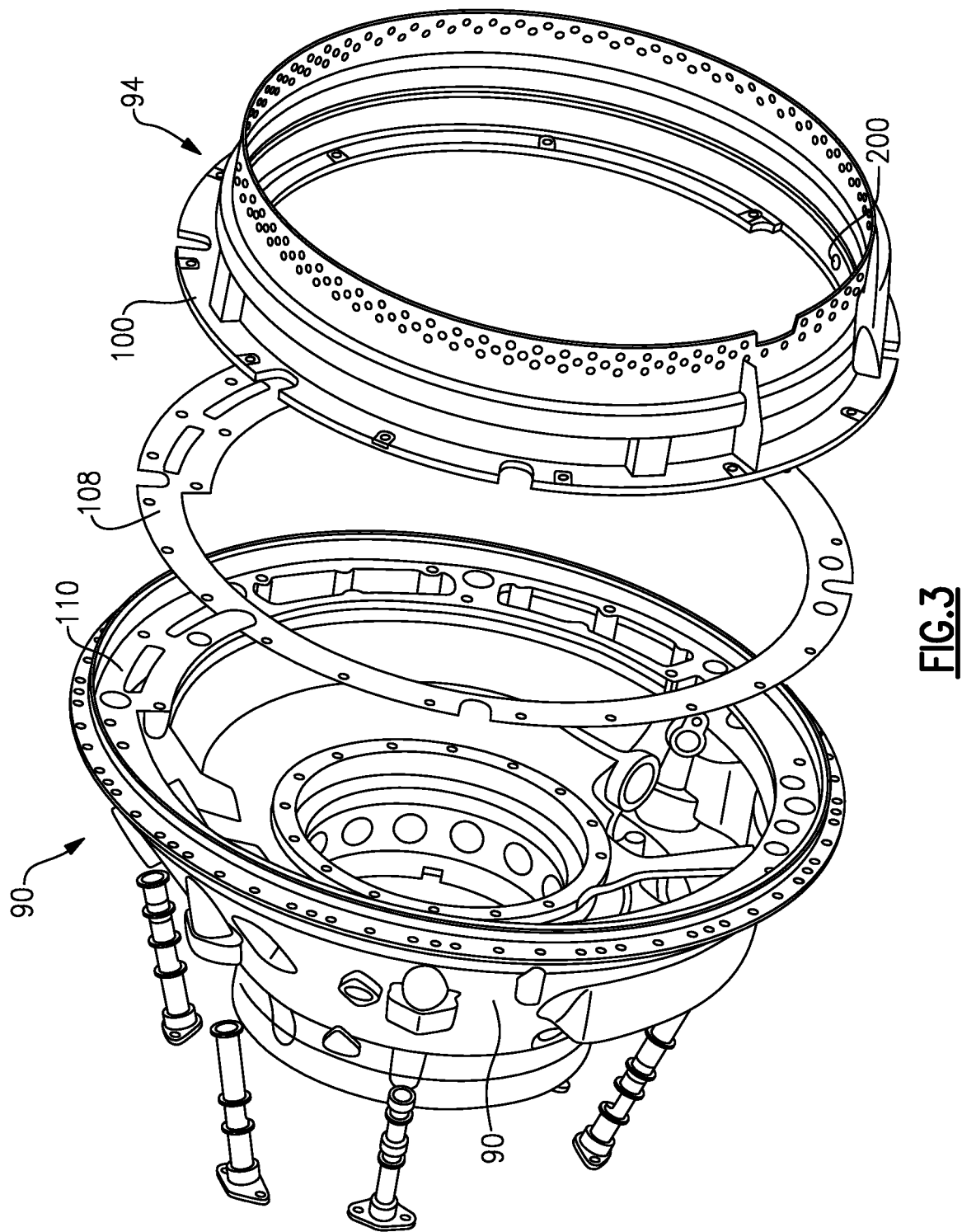
FIG. 3 is an exploded view of several components that are illustrated in FIG. 2.

FIG. 3 is an exploded view showing the bearing support 90 having surface 110. The gasket 108 is positioned intermediate this surface 110 and a surface 100 on the oil channel 94.

The oil channel 94 operates in a known manner to collect the oil and drain the oil from a vertically lower space 200, shown schematically in FIG. 3.

Figure 4:
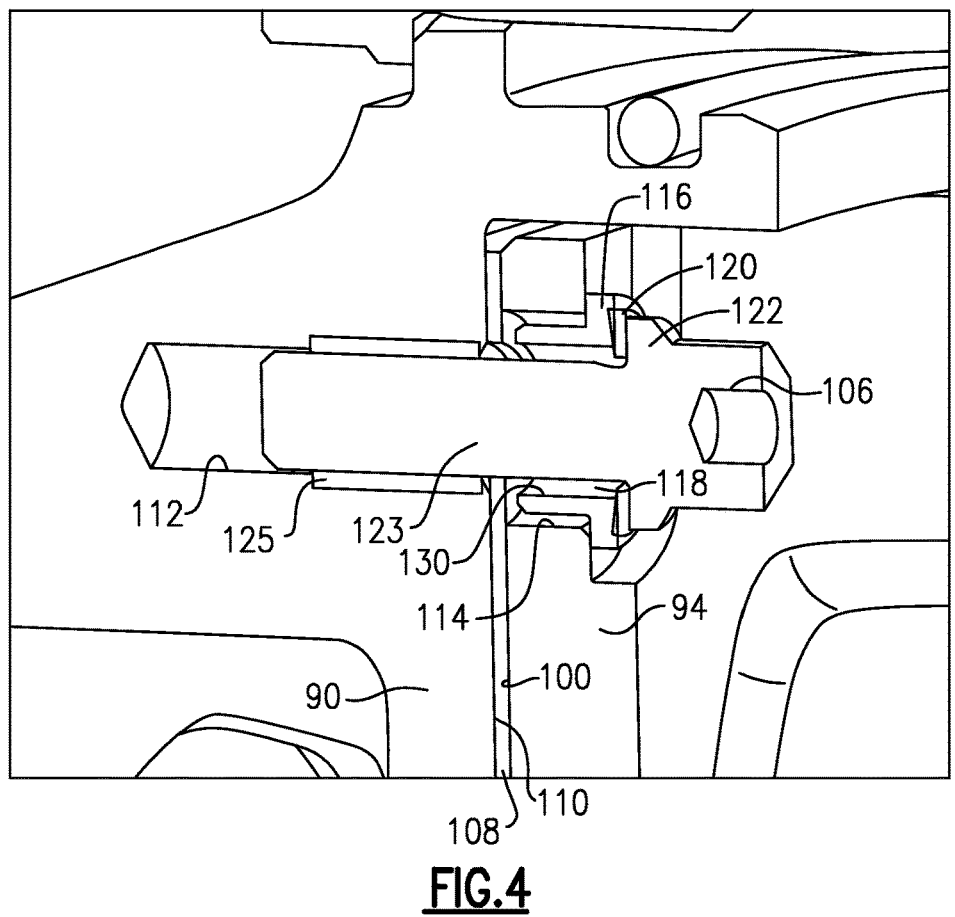
FIG. 4 is an enlarged prospective view of a portion of FIG. 2 cross-section.

As shown in FIG. 4, the face 100 in the oil channel 94 is spaced from the face 110 of the bearing support by the gasket 108.

A bolt 106 has a threaded body 123 received on threads 125 within a bore 112 in the bearing support 90. The threads 125 may be formed on a separate component inserted into bore 12. A steel insert 116 is pressed into an opening 114 in the oil channel 94. It should be understood that the structure about to be described in FIG. 4 is at a number of locations where the bolts 106 are utilized to secure the oil channel 94 to the bearing support 90, and at both circumferentially spaced locations and at the two radial positions shown in FIG. 2. The steel insert 116 is separated from a head 122 of the bolt 106 by a Belleville washer 120. As shown, there is a space 118 between an outer periphery of the extending portion (shaft) 123 of the bolt 106, and an inner periphery of a hole or opening 130 in the insert 116. While a bolt is disclosed, other elongated connecting members may be used. As can be appreciated from the above description and FIGS. 3 and 5, the oil channel 94 extends 360 degrees about a central axis of the engine. The same is true of the bearing support 90. There are also a plurality of slots in the oil channel, and a plurality of bolt holes 112 in the bearing support.

Figure 5:
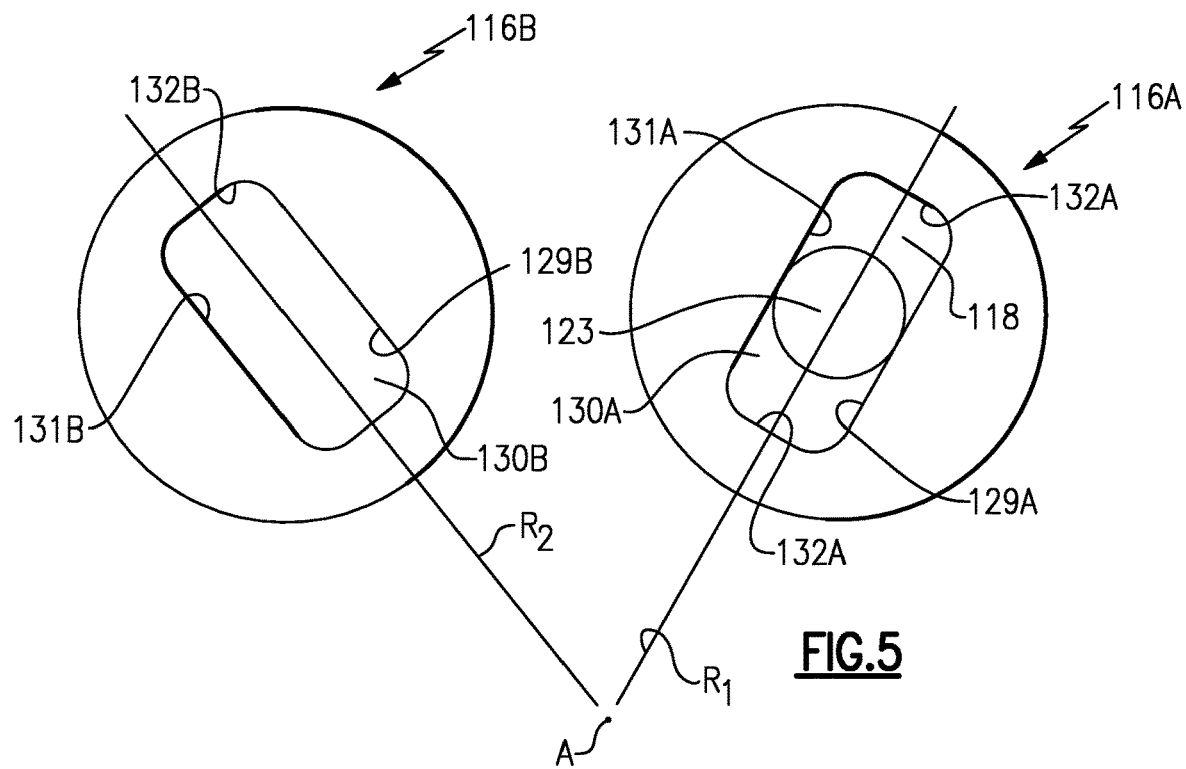
FIG. 5 shows a detail of guided movement.

As shown in FIG. 5, one opening, or slot, 130A is generally racetrack shaped or has two curves 132A at the end of elongated straight portions 129A and 131A. That is, the opening is generally rectangular with curves formed by rounded corners. The curves 132A are spaced from each other by a greater distance than a diameter of the extending portion 123 of the bolt 106. This provides the clearance 118 as mentioned above. As shown in FIG. 5, two of the circumferentially spaced inserts 116A and 116B are shown. The elongated straight portions 129A and 131A are generally parallel to each other, and spaced by equidistance from a first radial line R1 extending from a central line A of the engine. A second insert 116B is also shown having elongated straight portions 129B and 131B which are also parallel to each other, and which are spaced equidistance from a radial line R2. The elongated straight portions 131A and 129A are not parallel to the elongated straight portions 131B and 129B. This allows adjustment in a radial direction across the circumference of the oil channel 944. The slots 130A/B could be defined to have a width measured perpendicular to a radial line, and perpendicular to elongated straight portions 129A and 131A. The width closely receives the extending portion 123. Further, a length can be described between the curves 132A, and the length is relatively larger than an outer periphery of the extending portion E123.

Now, during operation, the engine 20 and the gear drive 48 will become hot. The oil channel 94 will expand at a distinct rate than the bearing support 90. When this growth is in a radial direction, the extending portion 123 of the bolt may move between the ends 132, such that the oil channel 94 can move radially relative to the bearing support 90 as the engine heats and cools. The sides 129 and 131 will guide this movement to be generally purely radial. This radial motion ensures the oil channel 94 remains concentric with the fan drive gear system thus ensuring efficient removal of oil, and preventing local contact with the fan drive gear system and the oil channel 94.

As the faces 110 and 100 move relative to each other, the gasket 108 prevents undue wear on either surface.

The inserts 116 may be formed of a material which is relatively hard compared to a material forming the oil channel 94. The inserts 116 and the bolts may be formed of an appropriate steel.

The Belleville washer 120 is initially compressed. If there is wear, the Belleville washer 120 will expand to ensure that there is still a clamping load properly clamping the oil channel 94 to the bearing support 90.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   a propuslor that includes a fan and a fan drive gear architecture for rotating about a central axis;
   said fan drive gear architecture including a number of intermediate gears connecting an output shaft of a fan drive turbine to a fan drive shaft for said fan; and
   an oil channel for collecting oil thrown radially outwardly of said fan drive gear architecture,
   a bearing support mounting bearings, said bearings supporting said fan drive shaft,
   said oil channel and said bearing support are fixed together by elongated connecting members,
   said connecting members having respective shafts extending through a plurality of slots in said oil channel and a plurality of bolt holes in said bearing support, and
   wherein a slot width of the slots is sized to closely receive said connecting member shafts and a slot length of the slots is larger than said slot width,
   whereby said connecting members may adjust in a radial direction within said slots to allow said oil channel and said bearing support to expand at different rates in the radial direction;
   said oil channel and said bearing support each extending for 360 degrees about said central axis;
   wherein said slots are generally racetrack shaped with two generally parallel side surfaces defining said slot width extending outwardly in a generally radial direction and curved ends at radial ends of said slots defining said slot length;
   wherein inserts are inserted into spaced locations in said oil channel and said inserts defining said slots;
   wherein a gasket is positioned intermediate said bearing support and said oil channel;
   wherein said inserts are formed of a material which is relatively hard compared to a material forming said oil channel; and
   wherein a Belleville spring washer sits between a head of said connecting members and said oil channel, with said Belleville washer urging said oil channel toward said bearing support to compensate for any wear during operation of the gas turbine engine.

2. The gas turbine engine as set forth in claim 1, wherein said oil channel has a pair of surfaces for receiving oil thrown radially outwardly of a ring gear in the fan drive gear architecture.

3. The gas turbine engine as set forth in claim 2, wherein said surfaces are spaced on opposed sides of a centerline of said ring gear.

4. The gas turbine engine as set forth in claim 1, wherein both said inserts and said connecting members are formed of a steel.

5. The gas turbine engine as set forth in claim 1, wherein said bearing support is formed of a titanium alloy and said oil channel is formed of aluminum.

6. The gas turbine engine as set forth in claim 1, wherein said connecting members are bolts.

7. The gas turbine engine as set forth in claim 6, wherein said inserts are force fit into said spaced locations in said oil channel.

8. The gas turbine engine as set forth in claim 7, wherein both said inserts and said bolts are formed of an appropriate steel.

9. A gas turbine engine comprising:
- a propuslor that includes a fan and a fan drive gear architecture for rotating about a center axis;
- said fan drive gear architecture including a number of intermediate gears connecting an output shaft of said turbine to a fan drive shaft for said fan;
- an oil channel for collecting oil thrown radially outwardly of said fan drive gear architecture, a bearing support mounting bearings, and said bearings supporting said fan drive shaft, said oil channel and said bearing support are fixed together by elongated connecting members, said connecting members having respective shafts extending through a plurality of slots in said oil channel and a plurality of bolt holes in said bearing support;
- said slots being generally racetrack shaped with two generally parallel side surfaces extending outwardly in a generally radial direction and curved ends at radial ends of said slots, inserts are inserted into spaced locations in said oil channel and said inserts defining said slots, a gasket positioned intermediate said bearing support and said oil channel, said oil channel having a pair of surfaces for receiving oil thrown radially outwardly of a ring gear in the fan drive gear architecture, said surfaces are spaced on opposed sides of a centerline of said ring gear, said bearing support is formed of a titanium alloy and said oil channel is formed of aluminum;
- a slot width of the slots defined perpendicular to said generally parallel side surfaces, and a slot length of the slots defined between said radial ends, and said slot width being sized to closely receive the shafts of said connecting members, and said slot length being larger than said slot width whereby said connecting members may adjust in a radial direction within said slots to allow said oil channel and said bearing support to expand at different rates in a radial direction;
- said oil channel and said bearing support each extending for 360 degrees about said center axis;
- wherein said inserts are formed of a material which is relatively hard compared to the aluminum forming said oil channel; and
- wherein a Belleville spring washer sits between a head of said bolts and said oil channel, with said Belleville washer urging said oil channel toward said bearing support to compensate for any wear during operation of the gas turbine engine.

\* \* \* \* \*